United States Patent [19]

Komatsu et al.

[11] Patent Number: 5,478,877
[45] Date of Patent: Dec. 26, 1995

[54] ANTISTATIC AGENT FOR POLYACETAL RESINS

[75] Inventors: Yoshinobu Komatsu; Hiroshi Igarashi, both of Tokyo; Takahisa Erami, Fuji, all of Japan

[73] Assignees: Mizusawa Industrial Chemicals, Ltd., Tokyo; Plyplastics Corporation Ld., Fuji, both of Japan

[21] Appl. No.: 391,189

[22] Filed: Feb. 21, 1995

Related U.S. Application Data

[62] Division of Ser. No. 214,500, Mar. 18, 1994.

[30] Foreign Application Priority Data

Mar. 22, 1993 [JP] Japan .................................. 5-85188

[51] Int. Cl.$^6$ ....................................................... C08K 3/10
[52] U.S. Cl. ...................................... 524/401; 524/425,437; 524/593; 524/779; 524/786
[58] Field of Search ................................... 524/401, 425, 524/443, 444, 593, 437, 786

[56] References Cited

U.S. PATENT DOCUMENTS

| | | | |
|---|---|---|---|
| 4,376,178 | 3/1983 | Blount | 524/593 |
| 4,837,400 | 6/1989 | Walter et al. | 524/593 |
| 4,987,174 | 1/1991 | Ying et al. | 524/444 |
| 5,288,840 | 2/1994 | Morishita et al. | 524/401 |
| 5,356,567 | 10/1994 | Ogawa et al. | 524/401 |
| 5,419,883 | 5/1995 | Ogawa et al. | 524/444 |

OTHER PUBLICATIONS

"Poly(ethylene–oxide)–Silicate Intercalation Materials" by Aranda et al. Chem. Mater., vol. 4 pp. 1395–1403, 1992

*Primary Examiner*—Tae H. Yoon
*Attorney, Agent, or Firm*—Sherman and Shalloway

[57] ABSTRACT

An antistatic agent imparting excellent antistatic property to the polyacetal resins and the polyacetal resins using this antistatic agent. The antistatic agent for polyacetal resins is obtained by including polyalkylene polyols or metal salt-dissolved polyalkylene polyols in a basic carbonate of metals consisting chiefly of alkali metals and aluminum having a porous volume of 0.5 cc/g or larger over a region of meso pores to quasi-macro pores of porous radii of from 200 to 1000 angstroms or in an anion exchanger thereof, said porous volume being greater than 30% of the whole porous volume, and a polyacetal resin composition in which said antistatic agent is blended. The antistatic agent of the invention imparts stable antistatic properties to the above resins and is little dependent upon the environment, and further does not lose thermal property or mechanical strength that occurred with the conventional antistatic agents. Therefore, the resin composition can be extensively used in the field of engineering plastics.

10 Claims, 2 Drawing Sheets

ANTISTATIC AGENT FOR POLYACETAL RESINS

This is a division of application Ser. No. 08/214,500, filed Mar. 18, 1994.

BACKGROUND OF THE INVENTION

1. Field of the Invention

The present invention relates to an antistatic agent for polyacetal resins exhibiting excellent antistatic effect and to a polyacetal resin composition using the above agent. More specifically, the invention relates to an antistatic agent which imparts stable antistatic effect to the polyacetal resins and is little dependent upon the environment, without impairing mechanical properties, thermal properties, moldability and machinability.

2. Description of the Prior Art

Owing to their excellent mechanical properties, thermal properties, long-lasting properties, abrasion properties, moldability and machinability, the polyacetal resins have been used as engineering plastic materials in a broad field of applications such as automobiles, electric and electronic appliances. Like many other plastic materials, however, the polyacetal resins have high surface resistivities causing troubles that stem from the electrification such as electrostatic noise, surface fouling, and adhesion of matters, depending upon the applications. In order to eliminate such troubles, a variety of antistatic agents have heretofore been used.

Such antistatic agents are effective even for the polyacetal. However, the ionic substances, such as anionic and cationic antistatic agents, and a mixture of a polyethylene oxide (PEO) and an alkali metal salt (e.g., Japanese Laid-Open Patent Publication No. 139266/87), are not desirable since they cause the polyacetal to be discolored and to lose the thermal stability. Nonionic antistatic agents have been proposed giving little adverse effects, which, however, exhibits generally small antistatic effect and must be added in large amounts if it is attempted to decrease the electrification properties down to the practicable level.

However, addition of the antistatic agents in large amounts generally causes the molded articles to lose their mechanical properties, moldability and machinability and, particularly, causes much bleeding on the surfaces of the molded articles to deteriorate the appearance. In general applications, furthermore, the antistatic agents have problems in maintaining antistatic effect and stability, such as losing the antistatic effect when the molded articles are washed with a solvent or are preserved in a low-humidity environment.

SUMMARY OF THE INVENTION

The object of the present invention therefore is to provide an antistatic agent for polyacetal resins, which can be blended without deteriorating the thermal stability, mechanical strength and machinability of the polyacetal resins, is little dependent upon the environment and stably exhibits antistatic property for extended periods of time.

Another object of the present invention is to provide a polyacetal resin composition which exhibits excellent antistatic property, excellent properties inherent in the engineering plastic materials and excellent anti-bleeding property, and does not cause the resin to be colored in a particular hue.

According to the present invention, there is provided an antistatic agent for polyacetal resins comprising an inclusion product obtained by including polyalkylene polyols or alkali metal salt-dissolved polyalkylene polyols in a basic carbonate of metals consisting chiefly of alkali metals and aluminum having a porous volume (Vm) of 0.5 cc/g or larger over the porous radii of from 200 to 1000 angstroms as measured by a mercury porosimeter method, and a porous volume ratio as expressed by Vm/Vo of 30% or larger with respect to the whole porous volume (Vo cc/g) or in an anion exchanger thereof.

According to the present invention, furthermore, there is provided a polyacetal resin composition obtained by blending said antistatic agent in an amount of from 0.1 to 40 parts by weight per 100 parts by weight of the polyacetal resin.

DETAILED DESCRIPTION OF THE INVENTION

According to the present invention, a distinguished feature resides in that the antistatic agent is obtained by including polyalkylene polyols or alkli metal salt-dissolved polyalkylene polyols in a basic carbonate of metals consisting chiefly of alkali metals and aluminum having a porous volume of 0.5 cc/g or larger over the porous radii of from 200 to 1000 angstroms or in an anion exchanger thereof.

As will be demonstrated in Examples appearing later, the antistatic agent little causes the polyacetal resin to be thermally decomposed or to lose the mechanical strength even when it is blended in the resin in a considerably large amount and is melt-molded, contrary to the conventional ionic compounds which caused thermal decomposition and reduction in the mechanical strength without exception.

Moreover, the antistatic agent of the present invention exhibits excellent antistatic property even when it is blended in such a small amount as 1 part by weight or less per 100 parts by weight of the polyacetal resin, and this antistatic property is not quite lost even when the surface of a resin molded article is wiped with methanol or the like or even under low-humidity conditions.

With the conventional surfactant-type antistatic agents, the antistatic property was not obtained without the bleeding phenomenon on the surface. By using the antistatic agent of the present invention, however, excellent antistatic property is obtained without the bleeding phenomenon.

Moreover, the antistatic agent of the present invention contains components which are all colorless (transparent) or white, and little causes the blended resin to be colored in a particular hue, and maintains the molded article of resin in white color or enables the molded article of resin to be colored in any hue.

It is presumed that the antistatic property of the antistatic agent of the present invention is imparted through an ionic conduction mechanism though it has not yet been fully clarified. It is considered that the component that supports the ionic conduction is an alkali metal component in a basic carbonate or in an anion exchanger thereof, or an alkali metal salt dissolved in a small amount in polyalkylene polyols. The resin is not thermally deteriorated and is not colored by ionic components despite there are contained such an alkali metal component (ionic component) and polyalkylene polyols. This fact is closely related to the inclusion structure in which polyalkylene polyols are included in the basic carbonate or in an artion exchanger thereof.

That is, the basic carbonate or the anion exchanger thereof that serves as a base material has a hydroxyl group in the molecules, and exhibits large affinity to the polyalkylene polyol, and further has a porous volume which is as large as 0.5 cc/g or more over a region of so-called meso pores or quasi-macro pores of porous radii of from 200 to 1000 angstroms, and holds the polyalkylene polyol in the porous volume.

Figure 1:
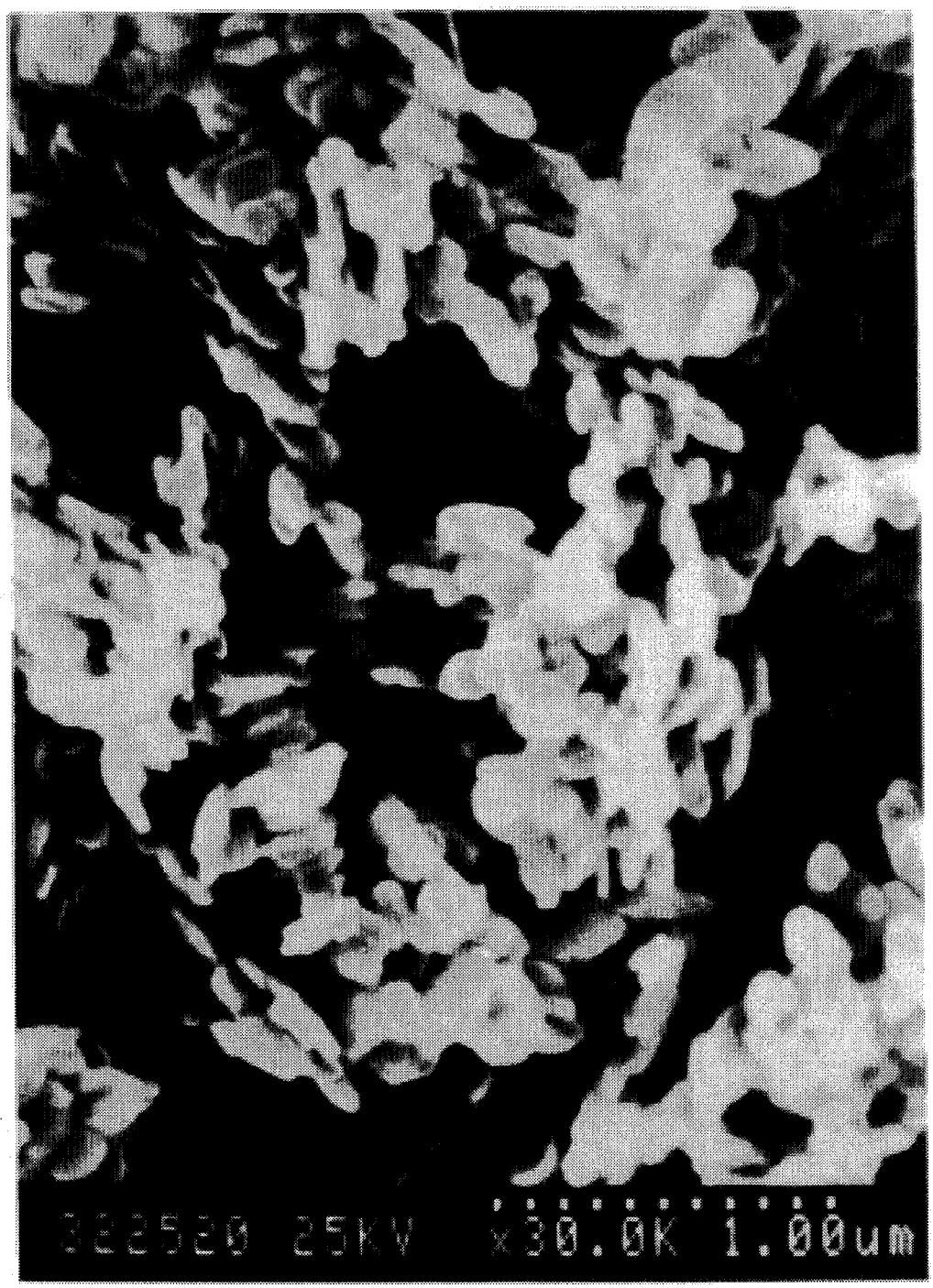
FIG. 1 is a scanning-type electron microphotograph of the structure of grains of a base material 6 obtained according to an Example of the present invention at a magnification of 30,000 times.
Figure 2:
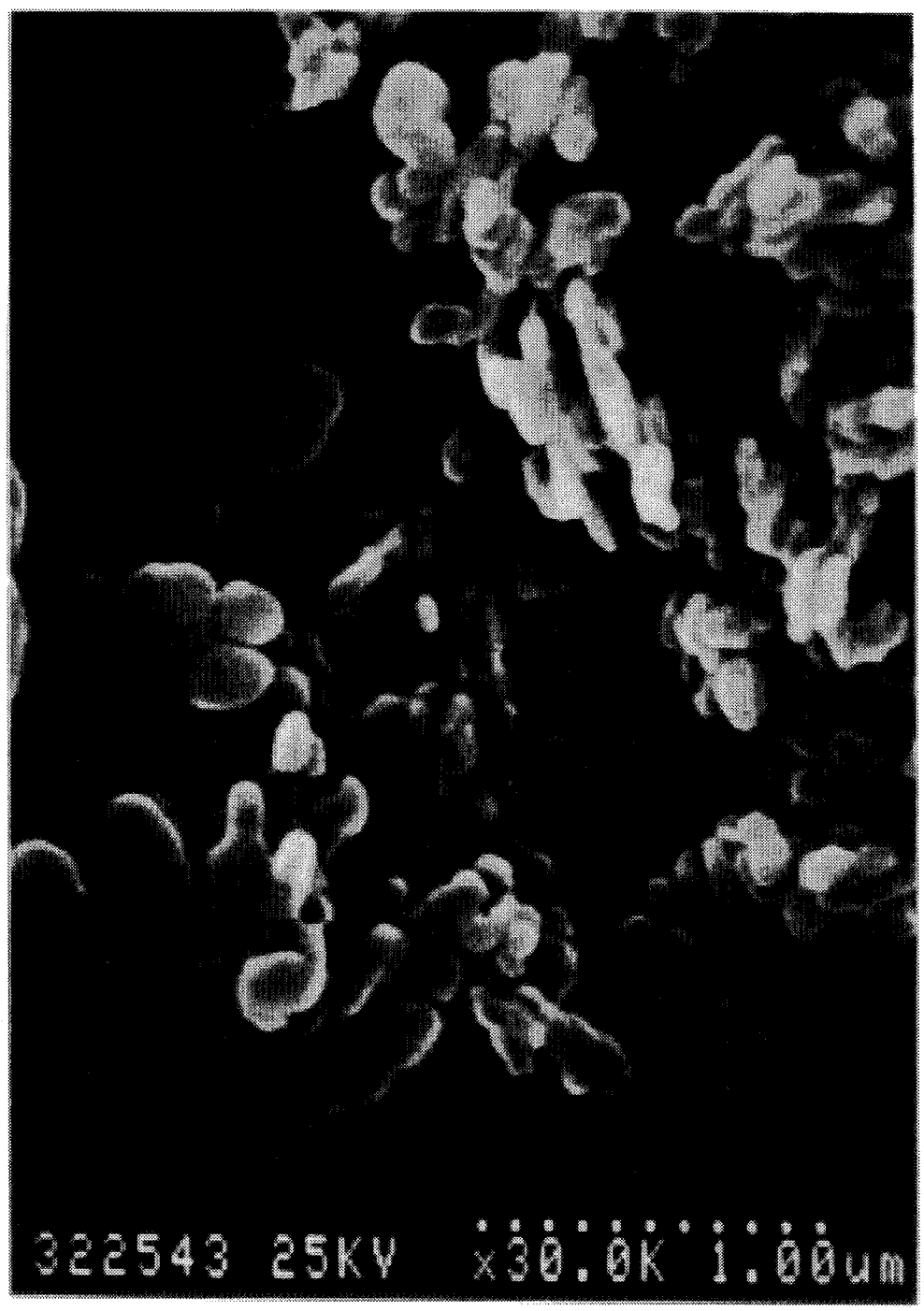
FIG. 2 is a scanning-type electron microphotograph of the structure of grains of an antistatic agent (No. E-8) obtained according to an Example of the present invention at a magnification of 30,000 times.

The inclusion structure is confirmed from a scanning-type electron microphotograph. The accompanying FIG. 1 is a scanning-type electron microphotograph showing the structure of grains of a basic carbonate (for details refer to Example 6 appearing later) used in the present invention, and FIG. 2 is an electron microphotograph showing the structure of gains of an antistatic agent of the present invention obtained by including a polyethylene glycol or the like in the basic carbonate of FIG. 1. When they are compared together, it will be confirmed that the grains in FIG. 2 are slightly spreading toward the a-axis and the b-axis though there is almost no change in the shape and structure of the primary grains. Though the details are not known, it is presumed that the base material of the present invention having a layer-like structure is forming primary grains in which unit layer-like structures are laminated into several layers, a card house structure is easily formed by the interlayer gap and by the van der Waals force of groups of relatively flat grains which are ultra-fine primary grains, and an organic compound such as a polyethylene glycol or the like is effectively held in the gaps of meso porous size to quasi-macro porous size of porous radii of from 200 to 1000 angstroms possessed by the groups of primary grains.

It is presumed that when the antistatic agent of the present invention is blended in the polyacetal resin, and is melted and molded, the polyethylene glycol or the like in the inclusion grains elutes out in a suitable amount into a continuous resin layer, and the ionic conduction takes place due to an alkali metal component via a medium such as the polyethylene glycol.

As will become obvious from Examples and Comparative Examples described later, furthermore, it is presumed that the organic compound such as the polyethylene glycol or the like is not included in the meso pores or micro pores of smaller than 200 angstroms, and are easily occluded in macro pores of larger than 1000 angstroms but easily escape therefrom and art not stably held, causing the antistatic property to diminish and developing such a trouble as bleeding out.

(Basic Carbonate or Ion Exchanger thereof)

The base material of the present invention comprises a basic carbonate of metals consisting chiefly of alkali metals and aluminum, or an anion exchanger thereof. The metals may further include alkaline earth metals such as magnesium, calcium and barium, and metal components of the group IIB such as zinc and the like, in addition to the above-mentioned metals.

Carbonate anions in the basic carbonate are many inorganic or organic anions such as sulfate ions, sulfite ions, ions of oxy acid of phosphorus, hydrohalogenic acid, ions of perhalogenic acid, acetic acid, succinic acid, maleic acid, stoatic acid, adipic acid and alkylsulfonic acid, at least part of which being capable of exchanging ions. These anion exchangers can also be used for accomplishing the objects of the present invention. Anions should generally be carbonate ions from the standpoint of thermal stability.

In general, the basic carbonate or the anion exchanger thereof has a composition represented by the formula (1),

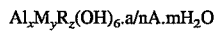
$Al_xM_yR_z(OH)_6 \cdot a/nA \cdot mH_2O$ wherein M is an alkali metal, R is an alkaline earth metal, A is an anion, x is a number of from 0.6 to 3 and, particularly, from 1 to 3, y is a number of from
0 to 3 and, particularly, from 1 to 9, z is a number of from 0 to 2.4 and, particularly, from 0 to 2, y+z is a number which is not 0, a is a number of from 0 to 6 and, particularly, from 1 to 8, n is a valency of anion A, and m is a number of not greater than 3.

Among them, it is desired that the atomic ratio x/y of aluminum to the alkali metal M is from 1 to 2 from the standpoint of thermal stability and antistatic property. Furthermore, it is desired that the equivalent ratio OH/A of hydroxyl group to anion is from 1 to 3 from the standpoint of antistatic properties and preventing bleeding.

The alkali metal components may be Li, Na and K. Among them, Li is preferred from the standpoint of electric conductivity. It is of course allowable to use Na and K though their electric conductivities are slightly inferior.

The basic carbonate and the ion exchanger thereof used in the present invention may be in the form of uniformly intimate compositions or fine crystals or crystals. Generally, however, finely crystalline one is preferred from the standpoint of excellent dispersion.

A particularly preferred example of the basic carbonate may be an aluminum lithium hydroxy carbonate which ideally has a chemical structure represented by the formula (2),

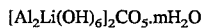
$[Al_2Li(OH)_6]_2CO_3 \cdot mH_2O$

In this structure, $Al^{3+}$ forms a gibbsite-type layer-like lattice of an octahedral form in which a Li+ ion exists at a vacant lattice point. The composition ratio can be changed depending upon the degree of substitution for the vacant lattice points.

Another preferred example of the basic carbonate may be an aluminum sodium hydroxy carbonate which ideally has a chemical structure represented by the formula (3),

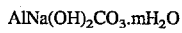
$AlNa(OH)_2CO_3 \cdot mH_2O$

The basic carbonate used in the present invention is obtained by reacting a water-soluble aluminum salt, an alkali carbonate and, as required, a water-soluble alkaline earth metal salt at a predetermined ratio of amounts in the presence of an alkali hydroxide, and, as required, aging the formed co-precipitated products or further effecting the hydrothermal treatment.

As the water-soluble aluminum salt, an aluminum chloride is particularly suited but sulfate and nitrate can be used, too. As the alkali carbonate, there can be used a lithium carbonate, a sodium carbonate and a potassium carbonate. As the alkaline earth metal a chloride can be favorably used, but a nitrate can be used, too. As the alkali hydroxide, a caustic soda can be used.

The reaction should be carried out in an aqueous medium and generally under the condition where a carbonate exists in excess amounts. In general, it is desired to carry out the reaction by adding a solution containing a water-soluble aluminum salt and an alkaline earth metal salt to the solution of the alkali carbonate and the alkali hydroxide. The reaction temperature should preferably be from 40° to 200° C.

The co-precipitated products are generally in the form of a uniformly intimate composition or fine crystals, and can be used in their form to accomplish the objects of the present invention. Generally, however, the co-precipitated products are aged in water heated at a temperature of 60° to 100° C. to adjust the grain size, and are then used to accomplish the objects of the present invention. The aged products can be further subjected to the aging processing at a high temperature (80° to 110° C.) and to the hydrothermal treatment at a temperature of 110° C. or higher, so that the products are precipitated in a more developed fine crystalline form or crystalline form.

It is desired that the basic carbonate or the anion exchanger thereof used in the present invention has a porous volume of 0.5 cc/g or larger and, particularly, 1.0 cc/g or larger over a region of meso porous size to quasi-macro porous size of porous radii of from 200 to 1000 angstroms as measured by the mercury manometric method.

Furthermore, it is desired that the basic carbonate or the anion exchanger thereof usually has a number average primary grain size of from 0.05 to 1.0 μm and, particularly, from 0.05 to 0.5 μm as measured by an electron microscope method, and further has a secondary grain size (median diameter) of from 0.5 to 10 μm and, more preferably, from 1 to 5 μm and, particularly, from 1 to 9 μm as measured by a Couter counter method.

Furthermore, the basic carbonate or the anion exchanger thereof may be subjected to an ordinary surface treatment in order to suppress the coagulation and so that it can be dispersed in a polyacetal resin. For instance, fatty acid, an ester of fatty acid and a metal salt of fatty acid can be used as a surface treating agent.

(Antistatic Agent)

According to the present invention, the basic carbonate or the anion exchanger thereof is used as a base material and in which are included polyalkylene polyols or alkali metal salt-dissolved polyalkylene polyols. Preferred examples of the polyalkylene polyols include a polyethylene glycol (PEG) as well as a polyoxyethylene-polyoxypropylene copolymer, an ethylene glycol, a propylene glycol, a glycerin, a pentaerythritol, an adduct of a polyhydric alcohol such as sorbitol and the like and an ethylene oxide or a propylene oxide, and esters formed by fatty acids and an ethylene oxide or a propylene oxide.

The polyalkylene glycol may have a variety of molecular weights and should usually have a number average molecular weight of 10000 or smaller and, particularly, from 200 to 8000 from the standpoint of electric conductivity and anti-bleeding property in combination.

The polyalkylene glycols having various molecular weights can be used being mixed together. Particularly excellent antistatic property is obtained when, for example, a polyalkylene glycol having a molecular weight of as small as from 100 to 1000, a polyalkylene glycol having an intermediate molecular weight of from 1000 to 3000 and a polyalkylene glycol having a molecular weight of as large as from 3000 to 9000 are used being mixed at a weight ratio of 3–6:1–3:1–3.

The polyalkylene polyols should be contained in an amount of from 20 to 110 parts by weight and, particularly, from 60 to 100 parts by weight per 100 parts by weight of the inorganic base material. When the amount is smaller than the above range, the antistatic property is not sufficient and when the amount is larger than the above range, the bleeding tends to develop.

It is allowable to use polyalkylene polyols in which an alkali metal salt is dissolved instead of using polyalkylene polyols. Examples of the alkali metal salt include a lithium perchlorate, a lithium iodide, a lithium trifluoromethane sulfonate, $LiBF_4$, a sodium iodide, $NaCF_3SO_3$, $KCF_3SO_3$, a lithium stearate, a sodium stearate, a zinc stearate, a lithium maleate, a lithium succinate, a potassium succinate, a lithium adipate and a lithium glycinate and the like. The alkali metal salt should be used in an amount of from 1 to 20 parts by weight and, particularly, from 1.5 to 5 parts by weight per 100 parts by weight of the polyalkylene polyols.

Polyalkylene polyols or alkali metal salt-dissolved polyalkylene polyols are included in the basic carbonate or in the anion exchanger thereof by drying the basic carbonate or the anion exchanger thereof at a temperature of from 80° to 120° C., adding polyalkylene polyols which are being melted (80° to 120° C.) to the powder heated at the above temperature, sufficiently mixing them together, and further mixing them together under a cooled condition. The mixture is stirred by using a super mixer, a Henschel's mixer, a ball mill pulverizer, a rotary granulator, a fluidized-bed granulator with a spray, a V-type mixing machine, a double-shaft rotor type mixer, a ribbon-type mixer or a Muller type mixer.

(Polyacetal Resin Composition)

According to the present invention, the polyacetal resin is blended with the above inclusion compound to impart excellent antistatic properties without impairing other properties.

As the polyacetal resin used in the present invention, there can be used either a polyacetal homopolymer or a polyacetal copolymer in which majority portion of the main chain comprises an oxymethylene chain.

The antistatic agent of the present invention should be blended usually in an amount of from 0.1 to 40 parts by weight and, particularly, from 1.0 to 30 parts by weight per 100 parts by weight of the resin, and the amount of blending can be selected depending upon the antistatic properties that are required. Furthermore, a variety of widely known stabilizers may be added to the composition of the present invention.

EXAMPLES

The present invention will be described more concretely by way of Examples, but it should be noted that the invention is in no way limited thereto only.

The antistatic agents of the present invention were mixed in amounts as shown in Tables 3, 4, 5 and 6 to 100 parts by weight of the polyacetal resin (produced by Polyplastics Co., trade name: DURACON M90) that is shown in Tables 4, 5 and 6. By using an extruder, the mixtures were melted and kneaded to prepare pelletized compositions. The pellets were injection-molded to prepare test pieces which were then evaluated. The results were as shown in Tables 3, 4, 5 and 6. The following constituent components were used for the Examples.

Antistatic Agent

Described below is a method of preparing an antistatic agent for the polyacetal resins obtained by including polyols in a basic carbonate porous material (base material) of metals consisting chiefly of alkali metals and aluminum and having meso pores.

(Base Material 1)

39.17 Grams of a sodium hydroxide and 11.16 g of a sodium carbonate were added to 1.0 l of water with stirring and were heated. Then, solutions of a magnesium chloride, an aluminum chloride and an ammonium chloride were gradually added thereto so that the molar ratio of Mg/Al was 2.0 and the molar ratio of $NH_3/Al$ was 0.35, and a reaction slurry having pH=10.2 was obtained. Then the reaction was carried out with stirring at a temperature of 40° to 90° C. for about 10 to 20 hours, followed by the addition of about 3.3 g of a stearic acid, to effect the surface treatment with stirring. The reaction product was then filtered, washed with water, dried at 70° C., and was pulverized using a small sample mill to obtain a base material 1.

(Base Materials 2 to 4)

Base materials 2, 3 and 4 were prepared in the same manner as that of preparing the base material 1, except that:

(1) the Mg/Al molar ratio was set to be 2.25, the $NH_3$/Al molar ratio was set to be 0.14, and stearic acid was added in an amount of 1.7 g;

(2) the Mg/Al molar ratio was set to be 3.00, the $NH_3$/Al molar ratio was set to be 0.14, and stearic acid was added in an amount of 1.5 g; and (3) the (Mg+Zn)/Al molar ratio was set to be 2.25, $MgCl_2$:ZnCl was set to be 9:1, and the $NH_3$/Al molar ratio was set to be 0.14.

The base materials 1 to 4 were of the type of a hydrotalcite.

(Base Materials 5 and 6)

50.0 Grams of a sodium hydroxide and 14.9 g of a sodium carbonate were added to 4.0 l of water with stirring and were heated at 40° C. Then, a solution obtained by dissolving 18.66 g of $Li_2CO_3$ and 99.56 g of $AlCl_3$ in 0.8 l of water were gradually poured thereto, so that the $CO_3$/Li molar ratio was 2.0 and the Al/Li molar ratio was 1.5, and a slurry having pH=10.7 was obtained. The slurry was then aged with stirring at a temperature of 80° to 100° C. for about 10 to 18 hours, and was equally divided into two. To the one slurry was added 1.1 g of stearic acid to effect the surface treatment with stirring. The slurry was then filtered, washed with water, dried at 70° C., and was pulverized using a small sample mill to obtain a base material 5.

The other remaining slurry was subjected to the hydrothermal treatment at 100° to 130° C. for 6 hours, and to the obtained reaction slurry was added 1.1 g of stearic acid to effect the surface treatment with stirring. The slurry was then filtered, washed with water, and was dried at 70° C. to obtain a base material 6.

(Base Material 7)

A base material 7 was obtained in the same manner as that of the base material 5 but adjusting the $CO_3$/Li molar ratio to be 0.7 and the Al/Li molar ratio to be 2.0.

The base materials 5 to 7 possessed the chemical composition represented by the formula (2) described earlier.

(Base Material 8)

A base material 8 was obtained in the same manner as that of the base material 7 but adjusting the $CO_3$/Na molar ratio to be 1.5 and Al/Na molar ratio to be 1.0 by using solutions of a sodium hydroxide, a sodium carbonate and an aluminum chloride, effecting the ripening at 90° to 100° C. and effecting the hydrothermal treatment at 110° to 140° C. for 6 hours.

The base material 8 possessed the chemical composition represented by the formula (3) described earlier.

(Properties of the Base Materials and Method of Measuring the Properties)

Properties of the base materials were measured by the methods described below, and the results were shown in Table 1.

Measuring Methods

1) Hunter's whiteness.

Measured by using an automatic reflection meter, Model TR-600 manufactured by Tokyo Denshoku Co.

2) Oil absorption.

Measured in compliance with JIS K-5101.

3) Specific surface area.

Measured based on the BET method using Sorptomatic Series 1800 produced by CARLOERBA Co.

4) The sample dried in a constant-temperature drier at 150° C. for 8 hours was accurately weighed in an amount of 0.5 g, and the whole porous volume Vo over porous radii of from 75000 to 18 angstroms of the sample and meso porous to quasi-macro porous volume Vm over porous radii of from 200 to 1000 angstroms, were found by using a mercury manometric porosimeter (Model AG65 produced by CARLO ERBA Co.).

The ratio Rm of the meso porous to quasi-macro porous volume (volume over meso porous to quasi-macro porous region) Vm relative to the whole porous volume Vo was found in accordance with the following relation, $Rm=Vm/Vo\times100$ 5) Primary grain size.

By using a scanning electron microscope WET-SEM (WS-250) produced by Akashi Beam Technology Co., the primary grains in an image of a limited visible field were arithmetically averaged to find a primary grain size (μm).

6) Secondary grain size.

Measured by using a Couter counter, Model TA-II, produced by Couter Counter Co. The dispersion medium was ISOTON II which was a dispersion solution for use exclusively in the Couter counter.

(Preparation of Inclusion Products)

Described below are antistatic agents of the present invention comprising inclusion products obtained by including polyalkylene polyols or polyalkylene polyols/alkali metal salts in the above-mentioned base materials 1 to 8.

(Antistatic Agent Group A)

The base materials 1, 4, 5, 6 and 8 were introduced each in an amount of 500 g into a small super mixer of a capacity of 10 L, treated under the conditions of 400 rpm or lower and a temperature of 100° to 120° C. for one hour, and to which were mixed a polyethylene glycol (PEG) that was melted at 90° to 100° C. and a lithium salt dissolved in the molten PEG in amounts as shown in Tables 2 and 3, under the conditions of a temperature of 90° to 100° C. and 400 rpm. The mixtures were then mixed at a high speed of 1200 rpm, and were discharged from the mixer under the conditions of a temperature of 60° C. or lower at 800 rpm in order to obtain an antistatic agent group A.

(Antistatic Agent Group B)

An antistatic agent group B was obtained in the same manner as that of the antistatic agent group A but using the base materials 2, 6 and 7 each in an amount of 500 g and using polyalkylene polyols other than the polyethylene glycol in amounts as shown in Tables 2 and 3.

The recipes of the antistatic agents (E-1 to E-20) prepared according to the above-mentioned method and used in the Examples were as shown in Tables 2 and 3, and their antistatic properties were as shown in Tables 4, 5 and 6. The resin molded products obtained in Examples 5, 23 and 26 emitted the odor of formalin.

COMPARATIVE EXAMPLES

For the purpose of comparison as described below, other inorganic base materials were used instead of the base materials of the present invention, the polyalkylene polyol only was used, the base material only was used, and known antistatic agents were used. The results were as shown in Tables 7 and 8.

(Comparative Examples H-1 to H-9)

(H-1)

Sedimentation-method silica having an oil absorption of 240 ml/100 g, a macro porous volume (hereinafter written as Ve) over porous radii of greater than 1000 angstroms of 2.3 cc/g and a BET specific surface area of 230 $m^2/g$, was impregnated with an organic compound in the same amount as the antistatic agent E-8 of Table 2 under the same conditions. The silica possessed Vm=0.8 cc/g and Vm/Vo= 20%.

(H-2)

An amorphous calcium silicate having an oil absorption of 10.0 ml/100 g, a Ve of 1.72 cc/g, a BET specific surface area of 95 $m^2/g$, an average secondary grain size of 2 μm and a $CaO/SiO_2$ molar ratio of 0.8, was impregnated with an organic compound in the same amount as the antistatic agent E-3 of Table 2. The calcium silicate possessed Vm=0.5 cc and Vm/Vo=18%.

(H-3)

An amorphous calcium silicate having an oil absorption of 270 ml/100 g, a Ve of 2.6 cc/g, a BET specific surface area of 320 $m^2/g$, an average secondary grain size of 6 μm and a $CaO/SiO_2$ molar ratio of 0.7, was impregnated with an organic compound in the same amount as the antistatic agent E-3 of Table 2. The calcium silicate possessed Vm=0.4 cc and Vm/Vo=17%.

(H-4)

To an aqueous slurry of a commercially available bayerite-type aluminum hydroxide having an average grain size of 1.8 μm were added, at a temperature of 40° C. with stirring, an aluminum chloride in an amount that corresponds to 5 mol % of aluminum component, as well as a lithium carbonate and a lithium chloride in an amount that corresponds to 5 mol % of lithium component, so that the $CO_3/Li$ molar ratio was 2.0 and the Al/Li molar ratio was 1.5, and was further added a sodium carbonate so that the pH of the slurry was 9.8. The mixture was treated with stirring at a temperature of 80° to 90° C. for about 6 hours, and was filtered, washed with water, dried and was pulverized to obtain a lithium/aluminum composite powder having the above composition.

This base material possessed an oil absorption of 85 ml/100 g, Vm=0.23 cc/g, Ve=1.1 cc/g and Vm/Vo=16.5%.

Then, this powder was impregnated with 20 parts by weight of a PEG #200 and 15 parts by weight of a PEG #400 per 100 parts by weight of the powder in the same manner as in the Examples. Unlike the antistatic agent of the present invention, this agent appeared to be wet on the surfaces of the grains.

Without using the base material, $LiClO_4$ was dissolved in PEG #200, PEG#2000 and PEG #6000 of amounts of the antistatic agent E-3 of Table 2.

(H-6)

The base material 5 described in the Example was used.

(H-7, 8 and 9)

A glycerin monostearate, a sodium alkylsulfonate and an alkylene ammonium chloride were selected as the known surfactants.

(Items to be Evaluated and Evaluation Method)

Heat Decomposition Properties

During the melting and kneading in a biaxial extruder for preparing composition pellets, the decomposition phenomena (foaming, discoloration, formalin odor) of the molten mixture were totally evaluated in five steps.

| 5 | 4 | 3 | 2 | 1 |
|---|---|---|---|---|
| none good | ← | decomposition phenomenon | → | large poor |

Mechanical Properties

The tensile strength was evaluated in compliance with the measuring method of ASTM D-638.

Antistatic Properties

A disk having a thickness of 3 mm and a diameter of 120 mm was prepared by the injection molding, and the surface resistivity and the half period of charged voltage were evaluated.

In order to evaluate the stability in the antistatic property, furthermore, evaluation was effected right after the surfaces of the molded article was washed under the following conditions. To valuate dependency upon the environment, furthermore, the evaluation was effected after the article was left under low-humidity conditions (23° C., 5% RH) for two days.

Surface resistivity: Measured by using ADVANTEST R8340 while applying a voltage of 500 V.

Half period of charged voltage: Measured by using Static Honestmeter manufactured by Shishido Shokai Co. while applying 6 kV.

Washing condition: Test pieces were submerged in methanol for 20 seconds and were dried by blowing off methanol on the surfaces with a nitrogen gas.

TABLE 1

| Base material | BET specific surface area ($m^2/g$) | Whole porous volume (Vo cc/g) | Meso porous to quasi-macro porous volume | | Oil absorption (ml/100 g) | Primary grain size (μm) | Secondary grain size (μm) | Whiteness (%) | pH |
|---|---|---|---|---|---|---|---|---|---|
| | | | Vm (cc/g) | Rm (%) | | | | | |
| 1 | 32.4 | 3.29 | 1.36 | 41.33 | 62 | 0.10 | 3.50 | 94 | 9.5 |
| 2 | 42.5 | 3.78 | 1.15 | 30.42 | 65 | 0.05 | 4.80 | 94 | 9.8 |
| 3 | 31.0 | 3.24 | 1.28 | 39.51 | 57 | 0.10 | 2.70 | 95 | 10.0 |
| 4 | 30.5 | 3.32 | 1.18 | 35.54 | 55 | 0.10 | 3.20 | 95 | 9.5 |
| 5 | 25.3 | 2.25 | 1.10 | 48.89 | 55 | 0.20 | 2.50 | 94 | 8.5 |
| 6 | 22.4 | 2.15 | 1.08 | 50.23 | 56 | 0.20 | 1.80 | 95 | 9.0 |

TABLE 1-continued

| Base material | BET specific surface area ($m^2/g$) | Whole porous volume (Vo cc/g) | Meso porous to quasi-macro porous volume Vm (cc/g) | Rm (%) | Oil absorption (ml/100 g) | Primary grain size (μm) | Secondary grain size (μm) | Whiteness (%) | pH |
|---|---|---|---|---|---|---|---|---|---|
| 7 | 27.8 | 2.37 | 1.15 | 48.52 | 60 | 0.15 | 4.70 | 94 | 8.4 |
| 8 | 10.5 | 1.52 | 0.61 | 40.13 | 50 | 0.50 | 3.80 | 94 | 8.0 |

TABLE 2

(Antistatic agent group A)

| Antistatic agent No. | Base material No. | Organic electrolyte. alkali salt (parts by wt)/100 parts by wt of base material | | | |
|---|---|---|---|---|---|
| E-1  | 1 | PEG #200 (40.2) | PEG #2000 (13.4) | PEG #6000 (13.4) | |
| E-2  | 5 | PEG #200 (49.2) | PEG #2000 (16.4) | PEG #6000 (16.4) | |
| E-3  | 5 | PEG #200 (48)   | PEG #2000 (16)   | PEG #6000 (16)   | $LiClO_4$ (2) |
| E-4  | 5 | PEG #200 (48)   | PEG #8000 (16)   | PEG #6000 (16)   | $LiClO_4$ (2) |
| E-5  | 5 | PEG #200 (48)   | PEG #2000 (14.5) | PEG #6000 (14)   | Li stearate (5.5) |
| E-6  | 5 | PEG #200 (48)   | PEG #2000 (15)   | PEG #6000 (15)   | Li laurate (4) |
| E-7  | 6 | PEG #200 (48)   | PEG #2000 (16)   | PEG #6000 (15.7) | Li maleate (2.3) |
| E-8  | 6 | PEG #200 (48)   | PEG #2000 (16)   | PEG #6000 (16)   | $LiClO_4$ (2) |
| E-9  | 6 | PEG #200 (48)   | PEG #2000 (16)   | PEG #6000 (15.4) | $KClO_4$ (2.6) |
| E-10 | 3 | PEG #1000 (45)  | PEG #2000 (12)   | PEG #4000 (12)   | $LiCF_3SO_3$ (3) |
| E-11 | 4 | PEG #1000 (40)  | PEG #2000 (12.5) | PEG #4000 (12.5) | $LiAlCl_4$ (2.5) |
| E-12 | 2 | PEG #2000 (23)  | PEG #4000 (18.5) |                  | $LiClO_4$ (1) |
| E-13 | 6 | PEG #200 (42)   | PEG #2000 (16.5) | PEG #6000 (16)   | Li glycinate (1.5) |
| E-14 | 8 | PEG #200 (48)   | PEG #2000 (16)   | PEG #6000 (15)   | $NaCFl_3SO_3$ (3) |
| E-15 | 7 | PEG #4000 (40)  |                  |                  | $LiClO_4$ (0.8) |

TABLE 3

(Antistatic agent group B)

| Antistatic agent No. | Base material No. | Organic electrolyte. alkali salt (parts by wt)/100 parts by wt of base material | |
|---|---|---|---|
| E-16 | 5 | polyoxyethylenemonooleyl ether (BO-20 produced by Nikko Chemicals Co.) (50) | $LiClO_4$ (2) |
| E-17 | 5 | polyoxyethylene monostearate (Noinion S15.4 produced Nippon Yushi Co.) (50) | $LiBF_4$ (2) |
| E-18 | 5 | polyoxyethyleneglycerin monostearate (Rikemal S-120, produced by Riken Vitamin Co.) | $LiBF_4$ (2) |
| E-19 | 5 | polyoxyethylenesorbitan monooleate (TO-10M, produced by Nikko Chemicals Co.) (50) | $LiClO_4$ (2) |
| E-20 | 5 | polyoxyethylene-oxypropylene copolymer (Planon 208, produced by Nippon Yushi Co.) (50) | $LiClO_4$ (2) |

TABLE 4

| | Example No. | | | | | | | | | |
|---|---|---|---|---|---|---|---|---|---|---|
| | 1 | 2 | 3 | 4 | 5 | 6 | 7 | 8 | 9 | 10 |
| Polyacetal resin (DURACON M90-44) (parts by weight) | 100 | 100 | 100 | 100 | 100 | 100 | 100 | 100 | 100 | 100 |
| Antistatic agent No. | E-1 | E-2 | E-3 | E-4 | E-5 | E-6 | E-7 | E-8 | E-9 | E-10 |
| (parts by weight) | (5) | (5) | (5) | (5) | (5) | (5) | (5) | (5) | (5) | (5) |
| Heat decomposition properties | 5 | 5 | 5 | 5 | 4 | 5 | 5 | 5 | 5 | 5 |
| Tensile strength ($Kgf/cm^2$) | 578 | 575 | 580 | 581 | 572 | 575 | 575 | 580 | 579 | 570 |
| Antistatic properties | | | | | | | | | | |

Before washing

TABLE 4-continued

|  | Example No. | | | | | | | | | |
|---|---|---|---|---|---|---|---|---|---|---|
|  | 1 | 2 | 3 | 4 | 5 | 6 | 7 | 8 | 9 | 10 |
| Surface resistance (Ω) | 2.7E+13 | 2.6E+13 | 1.8E+12 | 1.8E+12 | 4.0E+12 | 3.2E+12 | 3.7E+12 | 2.5E+12 | 6.7E+12 | 9.7E+12 |
| Half-life electrification (sec) | 23.3 | 21.2 | 3.5 | 4.1 | 10.1 | 8.7 | 9.2 | 8.9 | 14.8 | 17.2 |
| After washing | | | | | | | | | | |
| Surface resistance (Ω) | 3.2E+13 | 4.7E+13 | 2.7E+12 | 2.8E+12 | 4.5E+12 | 3.7E+12 | 4.2E+12 | 3.7E+12 | 8.3E+12 | 1.4E+13 |
| Half-life electrification (sec) | 25.8 | 29.2 | 5.3 | 4.9 | 13.2 | 10.7 | 12.8 | 11.0 | 16.0 | 18.1 |
| Low humidity | | | | | | | | | | |
| Surface resistance (Ω) | 4.9E+13 | 4.6E+13 | 3.3E+12 | 2.9E+12 | 4.8E+12 | 3.7E+12 | 6.5E+12 | 1.1E+13 | 9.5E+12 | 1.3E+13 |
| Half-life electrification (sec) | 38.2 | 30.0 | 9.0 | 7.8 | 12.7 | 12.1 | 14.0 | 14.7 | 17.0 | 17.9 |

TABLE 5

|  | Example No. | | | | | | | | | |
|---|---|---|---|---|---|---|---|---|---|---|
|  | 11 | 12 | 13 | 14 | 15 | 16 | 17 | 18 | 19 | 20 |
| Polyacetal resin (DURACON M90-44) (parts by weight) | 100 | 100 | 100 | 100 | 100 | 100 | 100 | 100 | 100 | 100 |
| Antistatic agent No. | E-11 | E-12 | E-13 | E-14 | E-15 | E-16 | E-17 | E-18 | E-19 | E-20 |
| (parts by weight) | (5) | (5) | (5) | (5) | (5) | (5) | (5) | (5) | (5) | (5) |
| Heat decomposition properties | 5 | 5 | 5 | 5 | 5 | 5 | 5 | 5 | 5 | 5 |
| Tensile strength (Kgf/cm$^2$) | 583 | 587 | 578 | 569 | 555 | 577 | 576 | 588 | 585 | 581 |
| Antistatic properties | | | | | | | | | | |
| Before washing | | | | | | | | | | |
| Surface resistance (Ω) | 1.5E+13 | 4.5E+13 | 1.0E+13 | 8.8E+12 | 1.4E+13 | 6.9E+12 | 8.8E+12 | 3.7E+12 | 6.8E+12 | 5.3E+12 |
| Half-life electrification (sec) | 19.6 | 32.9 | 15.8 | 14.2 | 20.0 | 11.2 | 15.3 | 10.1 | 14.2 | 12.1 |
| After washing | | | | | | | | | | |
| Surface resistance (Ω) | 1.7E+13 | 5.2E+13 | 1.1E+13 | 8.9E+12 | 1.7E+13 | 7.3E+12 | 8.8E+12 | 6.2E+12 | 7.2E+12 | 6.4E+12 |
| Half-life electrification (sec) | 21.0 | 34.2 | 16.2 | 16.1 | 21.0 | 14.4 | 15.7 | 15.1 | 15.8 | 14.3 |
| Low humidity | | | | | | | | | | |
| Surface resistance (Ω) | 2.3E+13 | 5.7E+13 | 1.9E+13 | 9.3E+12 | 3.8E+13 | 9.5E+12 | 1.7E+13 | 7.2E+12 | 1.0E+13 | 8.9E+12 |
| Half-life electrification (sec) | 24.8 | 38.3 | 20.8 | 17.0 | 26.7 | 19.8 | 20.3 | 16.3 | 14.8 | 16.5 |

TABLE 6

|  | Example No. | | | | | |
|---|---|---|---|---|---|---|
|  | 21 | 22 | 23 | 24 | 25 | 26 |
| Polyacetal resin (DURACON M90-44) (parts by weight) | 100 | 100 | 100 | 100 | 100 | 100 |
| Antistatic agent No. | E-3 | E-3 | E-3 | E-8 | E-8 | E-8 |
| (parts by weight) | (0.5) | (10) | (30) | (0.5) | (10) | (30) |
| Heat decomposition properties | 5 | 5 | 4 | 5 | 5 | 4 |
| Tensile strength (Kgf/cm$^2$) | 613 | 555 | 409 | 609 | 560 | 393 |
| Antistatic properties | | | | | | |
| Before washing | | | | | | |
| Surface resistance (Ω) | 3.9E+13 | 1.9E+11 | 7.3E+10 | 3.2E+13 | 3.2E+11 | 5.5E+10 |

TABLE 6-continued

|  | Example No. | | | | | |
| --- | --- | --- | --- | --- | --- | --- |
|  | 21 | 22 | 23 | 24 | 25 | 26 |
| Half-life electrification (sec) | 26.1 | <1 | <1 | 42.1 | <1 | <1 |
| After washing | | | | | | |
| Surface resistance (Ω) | 4.3E+13 | 2.3E+11 | 1.2E+11 | 6.1E+13 | 3.2E+11 | 5.7E+10 |
| Half-life electrification (sec) | 31.8 | <1 | <1 | 49.3 | <1 | <1 |
| Low humidity | | | | | | |
| Surface resistance (Ω) | 4.9E+13 | 9.4E+11 | 1.5E+11 | 4.9E+13 | 3.1E+11 | 6.9E+10 |
| Half-life electrification (sec) | 42.4 | 1.3 | <1 | 32.0 | 1.9 | <1 |

TABLE 7

|  | Comparative Example No. | | | | | |
| --- | --- | --- | --- | --- | --- | --- |
|  | 1 | 2 | 3 | 4 | 5 | 6 |
| Polyacetal resin (DURACON M90-44) (parts by weight) | 100 | 100 | 100 | 100 | 100 | 100 |
| Antistatic agent No. or name (parts by weight) | E-1 (5) | E-2 (5) | E-3 (5) | E-4 (5) | E-5 (5) | E-6 (5) |
| Heat decomposition properties | 1 | 2 | 1 | 3 | 3 | 3 |
| Tensile strength (Kgf/cm$^2$) | — | — | — | 521 | 492 | 589 |
| Antistatic properties | | | | | | |
| Before washing | | | | | | |
| Surface resistance (Ω) | — | — | — | 4.9E+12 | 3.2E+12 | 1.4E+15 |
| Half-life electrification (sec) | — | — | — | 9.8 | 12.8 | >150 |
| After washing | | | | | | |
| Surface resistance (Ω) | — | — | — | 6.7E+13 | 4.5E+13 | 1.1E+15 |
| Half-life electrification (sec) | — | — | — | 48.2 | 28.6 | >150 |
| Low humidity | | | | | | |
| Surface resistance (Ω) | — | — | — | 2.1E+13 | 3.7E+12 | 2.9E+15 |
| Half-life electrification (sec) | — | — | — | 24.5 | 12.1 | >150 |
| Remarks | A | A | A | B | C | strong formlin odor |

A: considerably decomposed during extrusion and could not be pelletized
B: strong formalin odor. bleed on the article surface (2 days after molded)
C: strong formalin odor. conspicuous beelding on the article surface (2 days after molded)

TABLE 8

|  | Comparative Example No. | | | |
| --- | --- | --- | --- | --- |
|  | 7 | 8 | 9 | 10 |
| Polyacetal resin (DURACON M90-44) (parts by weight) | 100 | 100 | 100 | 100 |
| Antistatic agent No. or name (parts by weight) | E-7 (5) glycerine monostearate | E-8 (5) Na alkyl-sulfonate | E-9 (5) Cl alkylene ammonium chloride | — |
| Heat decomposition properties | 4 | 1 | 1 | 5 |
| Tensile strength (Kgf/cm$^2$) | 520 | — | — | 620 |
| Antistatic properties | | | | |
| Before washing | | | | |
| Surface resistance (Ω) | 5.6E+11 | — | — | 1.7E+15 |
| Half-life electrification (sec) | 1.0 | — | — | >150 |

TABLE 8-continued

| | Comparative Example No. | | | |
|---|---|---|---|---|
| | 7 | 8 | 9 | 10 |
| After washing | | | | |
| Surface resistance (Ω) | 1.6E+15 | — | — | 2.0E+15 |
| Half-life electrification (sec) | 150 | — | — | >150 |
| Low humidity | | | | |
| Surface resistance | 7.1E+13 | — | — | 2.5E+15 |
| Half-life electrification (sec) | 40.3 | — | — | >150 |
| Remarks | A | B | B | |

A: conspicuous bleeding on the article surface (2 days after extrusion molding)
B: considerably decomposed during extrusion and could not be pelletized As will be obvious from the foregoing description and Examples, the antistatic agents of the present invention impart very good antistatic properties to the polyacetal resins, and the antistatic properties are not lost even after the surfaces of the resins are washed with solvents or even under the low-humidity conditions.

Moreover, the antistatic agents of the present invention do not almost permit the thermal properties and the mechanical properties to be deteriorated, that was the problem with the conventional known antistatic agents.

Owing to the above-mentioned properties, the polyacetal resin compositions of the present invention can be extensively used in the field of engineering plastics where the polyacetal resins have heretofore been used.

We claim:

1. A polyacetal resin composition obtained by blending an antistatic agent comprising an inclusion product obtained by including polyalkylene polyols or alkali metal salt-dissolved polyalkylene polyols in a basic carbonate of metals consisting chiefly of alkali metals and aluminum having a porous volume (Vm) of 0.5 cc/g or larger over the porous radii of from 200 to 1000 angstroms as measured by a mercury porosimeter method, and a porous volume ratio as expressed by Vm/Vo of 30% or larger. wherein Vo (cc/g) is the whole porous volume or in an anion exchanger thereof, in an amount of from 0.1 to 40 parts by weight per 100 parts by weight of the polyacetal resin.

2. The polyacetal resin composition of claim 1, wherein the basic carbonate of metals consisting chiefly of alkali metals and aluminum or the anion exchanger thereof has a chemical composition represented by the formula (1),

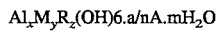

$$Al_xM_yR_z(OH)6.a/nA.mH_2O$$

wherein x is a number of from 0.6 to 3, y is a number of from 0 to 3, z is a number of from 0 to 2.4, y+z is a number which is not 0, a is a number of from 0 to 6, M is an alkali metal, R is an alkaline earth metal, A is an anion, n is a valency of anion A, and m is a number of not greater than 3.

3. The polyacetal resin composition of claim 1, wherein polyalkylene polyols or alkali metal salt-dissolved polyalkylene polyols are included in the antistatic agent in the amount of 20 to 110 parts by weight per 100 parts by weight of the basic carbonate or the anion exchanger thereof.

4. The polyacetal resin composition of claim 1, wherein the alkali metal salt-dissolved polyalkylene polyols of the antistatic agent are those in which the alkali metal salts are dissolved in amounts of from 1 to 20 parts by weight per 100 parts by weight of the polyalkylene polyols.

5. The polyacetal resin composition of claim 1, wherein the basic carbonate of the antistatic agent is an aluminum lithium hydroxycarbonate.

6. The polyacetal resin composition of of claim 1, wherein the basic carbonate of the antistatic agent is an aluminum sodium hydroxycarbonate.

7. The polyacetal resin composition of claim 1, wherein the polyalkylene polyols of the antistatic agent are polyethylene glycols.

8. The polyacetal resin composition of claim 1 wherein the polyacetal resin a polyacetal homopolymer in which the majority portion of the main chain comprises an oxymethylene chain.

9. The polyacetal resin composition of claim 1 wherein the polyacetal resin is a polyacetal copolymer in which the majority portion of the main chain comprises an oxymethylene chain.

10. The polyacetal resin composition of claim 1 obtained by blending the antistatic agent in an amount of from 1.0 to 30 parts by weight per 100 parts by weight of the polyacetal resin.

* * * * *